(12) United States Patent
Balczun

(10) Patent No.: US 7,891,092 B2
(45) Date of Patent: Feb. 22, 2011

(54) MULTI-RATE TORSIONAL COUPLING

(76) Inventor: Paul J. Balczun, 4818 Walker Blvd., Erie, PA (US) 16509

( * ) Notice: Subject to any disclaimer, the term of this patent is extended or adjusted under 35 U.S.C. 154(b) by 183 days.

(21) Appl. No.: 11/767,265

(22) Filed: Jun. 22, 2007

(65) Prior Publication Data
US 2007/0298888 A1 Dec. 27, 2007

Related U.S. Application Data

(60) Provisional application No. 60/816,690, filed on Jun. 27, 2006.

(51) Int. Cl.
*B23P 17/00* (2006.01)
(52) U.S. Cl. .......................... 29/888; 464/90
(58) Field of Classification Search .................. 464/30, 464/34, 41, 90; 29/402.03, 402.04, 402.06, 29/888; 192/209
See application file for complete search history.

(56) References Cited

U.S. PATENT DOCUMENTS

| | | | |
|---|---|---|---|
| 1,993,094 A | 8/1931 | Guy | |
| 2,869,340 A | 6/1957 | Saberton | |
| 2,873,590 A | 2/1959 | Croset | |
| 2,937,514 A * | 5/1960 | Van Ranst | 464/30 |
| 3,245,229 A | 4/1966 | Fadler | |
| 3,557,573 A | 1/1971 | Hansgen | |
| 3,727,431 A | 4/1973 | Yokel | |
| 4,031,714 A | 6/1977 | Faust | |
| 4,240,763 A | 12/1980 | Moore | |
| 4,693,354 A | 9/1987 | Umeyama et al. | |
| 4,861,313 A | 8/1989 | Zeiser et al. | |
| 5,050,446 A | 9/1991 | Takashima et al. | |
| 5,449,322 A | 9/1995 | Wagner | |
| 5,474,499 A | 12/1995 | Olson | |
| 5,573,462 A | 11/1996 | Sweeney et al. | |
| 5,704,839 A | 1/1998 | Michael et al. | |
| 5,735,746 A | 4/1998 | Colford | |
| 5,876,287 A | 3/1999 | Barickman | |
| 5,988,015 A | 11/1999 | Riu | |
| 6,077,165 A | 6/2000 | Jewell | |
| 6,234,905 B1 | 5/2001 | Gwinn et al. | |
| 6,280,332 B1 | 8/2001 | Knutson | |
| 6,471,593 B1 | 10/2002 | Hanke et al. | |
| 6,702,681 B1 | 3/2004 | Ochs | |
| 2004/0198499 A1 | 10/2004 | Kamdem et al. | |

FOREIGN PATENT DOCUMENTS

| | | |
|---|---|---|
| DE | 19525305 A1 | 1/1997 |
| EP | 0 471 209 A2 | 2/1992 |
| GB | 972890 | 10/1964 |

OTHER PUBLICATIONS

Lord Corporation, "Understanding Torsional Vibration", Design Monograph DM1107c, 1978.
International Search Report, PCT/US2007/071927, mailed Nov. 12, 2007.

* cited by examiner

*Primary Examiner*—Greg Binda

(57) ABSTRACT

A multi-rate torsional coupling (20) features parallel first and second drive connections (82 and 84) between input (24) and output (22) members. The first drive connection (82) extends through a first resilient coupling (38), and the second drive connection (84) extends through a second resilient coupling (40). An angular play coupling (70) engages the second drive connection (84) at a particular torque load for transmitting additional torque through the torsional coupling (20) at a higher spring rate.

2 Claims, 4 Drawing Sheets

MULTI-RATE TORSIONAL COUPLING

CROSS-REFERENCE TO RELATED APPLICATIONS

This application claims the benefit of U.S. Provisional Application No. 60/816,690, filed Jun. 27, 2006, which application is hereby incorporated by reference.

TECHNICAL FIELD

The invention relates to torsional couplings for transmitting torque along drivelines, and in particular, to such torsional couplings that isolate vehicle drivelines from engine disturbances.

BACKGROUND OF THE INVENTION

Torsional disturbances in drivelines, which can include continuous angular oscillations, compromise the performance and reliability of driveline components. For example, the torsional vibrations can produce damage, excessive wear, and noise in the driveline components.

Flexible torsional couplings between driving and driven members of the drivelines can smooth torque variations from engine disturbances, such as engine firing impulses, and reduce associated resonances and other torsional vibrations within the loaded drivelines. The flexible torsional couplings can incorporate elastomers or other resilient elements that provide a flexible coupling between the driving and driven members. The elastomers exhibit a given spring rate function by allowing angular deflection between the driving and driven members as a function of the torque applied across the elastomer.

For purposes of dampening vibrations, particularly in the drivelines of heavy-duty vehicles such as tractors and construction vehicles, different spring rate functions are more effective for different torque loads and speeds. A flexible dual-rate coupling disclosed in U.S. Pat. No. 5,573,462 to Sweeney et al. of Lord Corporation, the assignee of the current invention, includes elastomer couplings in series to provide different dampening spring rates for different torque ranges. The first elastomer, which exhibits a relatively low spring rate, is effective for transferring torque while dampening vibrations through a first range of torque values, and the second elastomer, which exhibits a relatively high spring rate, is effective for transferring torque and dampening vibrations through a second range of torque values. The two ranges are delineated by a snubber device that limits the angular deflection through which one of the elastomers is allowed to operate, while the other elastomer continues to operate for transmitting torque. This patent to Sweeney et al. is hereby incorporated by reference.

SUMMARY OF THE INVENTION

The invention among its preferred embodiments features a torsional coupling capable of exhibiting different spring rate functions over different ranges of torque by using multiple resilient couplings in parallel between driving and driven members. During a first lower range of torque transfer between the driving and driven members, the first resilient coupling can be arranged to transmit torque independently of the second resilient coupling, and during a second higher range of torque transfer between the driving and drive members, the first and second resilient couplings can be arranged to transmit torque together.

The resilient couplings are neither snubbed nor otherwise mechanically limited in relative motion. However, the second resilient coupling remains disengaged from transmitting torque until the first resilient coupling deflects by a predetermined angular amount (i.e., a predetermined amount of angular deflection has already occurred between the driving and driven members). The single resilient coupling exhibits a relatively low spring rate for dampening vibrations associated with a first range of lower driveline torque loads. Both resilient couplings combine to exhibit a relatively high spring rate for dampening vibrations associated with a second range of higher driveline torque loads. By combining the torque transmitting capabilities of two resilient couplings at the higher torque loads, neither resilient coupling is required to exhibit an exceptionally high spring rate or to convey the full range of torque loads.

One version of the invention as a multi-rate torsional coupling has parallel connections between input and output members. A first drive connection between the input and output members extends through a first resilient coupling. A second drive connection between the input and output members extends through a second resilient coupling. An angular play coupling along the second drive connection allows the second drive connection to remain at least partially disengaged from transferring torque together with the first drive connection between the input and output members until the input and output members are relatively angularly displaced through a threshold angle of play.

Preferably, the first drive connection operates alone for transferring torque between the input and output members at angular displacements of the input and output members less than the threshold angle of play. However, the first drive connection and the second drive connection are engaged in parallel for transferring torque between the input and output members at angular displacements greater than the threshold angle of play. For certain preferred embodiments, this threshold angle of play can be between 10 degrees and 30 degrees, more preferably between 15 degrees and 25 degrees, and even more preferably between 18 degrees and 22 degrees.

The first and second resilient couplings exhibit respective spring rate functions corresponding to a given amounts of torque per unit of angular displacement. When the first and second drive connections are engaged in parallel, the amount of torque per unit of angular displacement between the input and output members is related to a sum of the spring rates of the first and second resilient couplings. However, the amount of torque per unit of angular displacement between the input and output members is more closely related to the spring rate of the first resilient coupling before the second drive connection is engaged in parallel with the first drive connection.

The multi-rate coupling can include additional drive connections, including a third drive connection through a third resilient coupling located between the input and output members. A second angular play coupling forms a part of the third drive connection, allowing the third drive connection to remain at least partially disengaged from transferring torque together with the first and second drive connections until the input and output members are relatively angularly displaced through a second threshold angle of play. Preferably, the second threshold angle of play is larger that the first threshold angle of play.

The first drive connection is engaged for transferring torque between the input and output members at angular displacements of the input and output members less than the first threshold angle of play. The first drive connection and the second drive connection engage in parallel for transferring torque between the input and output members at angular displacements greater than the first threshold angle of play. The first drive connection, the second drive connection, and the third drive connection are all engaged in parallel for transferring torque between the input and output members at angular displacements greater than the second threshold angle of play.

Another version of the invention as a torsional coupling for dampening driveline vibrations includes first and second driveline connectors and first and second elastomers for separately connecting the first and second driveline connectors. A compound drive hub connected for rotation with the first driveline connector has a first contact surface engaged with the first elastomer and a second contact surface engaged with the second elastomer. A direct drive hub connected for rotation with the second driveline connector has a first opposing contact surface engaged with the first elastomer. An indirect drive hub connected for rotation with the second driveline connector through an angular play coupling has a second opposing contact surface engaged with the second elastomer. The angular play coupling has (a) a first coupling position at which a first range of torque is transmitted between the first and second driveline connectors through the first elastomer substantially independently of the second elastomer, and (b) a second coupling position at which a second higher range of torque is transmitted between the first and second driveline connectors through both the first and the second elastomers.

The angular play coupling can be progressively shifted from the first coupling position to the second coupling position as the first and second driveline connectors are relatively angularly displaced about a common axis of rotation. The angular play coupling allows the second elastomer to remain at least partially disengaged from transferring torque between the first and second driveline connectors until the driveline connectors are relatively angularly displaced through a threshold angle of play. The first elastomer is preferably angularly sheared by a given angular amount before the second elastomer is fully engaged for transferring torque between the first and second driveline connectors.

The compound drive hub, the direct drive hub, and the indirect drive hub preferably share a common axis of rotation with the first and second driveline connectors, and the first and second elastomers are preferably positioned in a common radial plane at different distances from the common axis of rotation. The first and second contact surfaces of the compound drive hub can be radially interleaved with the first and second opposing contact surfaces of the direct and indirect drive hubs. For example, the first contact surface of the compound hub can lie radially within the first opposing contact surface of the direct drive hub, the second contact surface of the compound hub can lie radially within the second opposing contact surface of the indirect drive hub, and the first opposing contact surface of the direct drive hub lies within the second contact surface of the compound hub.

For such purposes as providing torque overload protection, one of the first contact surface and the first opposing contact surface is bonded to the first elastomer, and the other of the first contact surface and the first opposing contact surface is not similarly bonded to the first elastomer to limit torque loads transmitted between the compound drive hub and the direct drive hub. Similarly, the second contact surface and the second opposing contact surface is bonded to the second elastomer, and the other of the second contact surface and the second opposing contact surface is not similarly bonded to the second elastomer to limit torque loads transmitted between the compound drive hub and the indirect drive hub. The first driveline connector can be adapted for connection to a drive shaft of the driveline and the second driveline connector is adapted for connection to an engine flywheel.

In addition, the torsional coupling can include a third elastomer for connecting the first and second driveline connectors. The compound hub has a third contact surface engaged with the third elastomer. A second indirect drive hub can be connected for rotation with the second driveline connector through a second angular play coupling and can have a third opposing contact surface engaged with the third elastomer. The second angular play coupling can have (a) a first coupling position at which the first and second ranges of torque are transmitted between the first and second driveline connectors through one or both of the first and the second elastomers, and (b) a second coupling position at which a third higher range of torque is transmitted between the first and second driveline connectors through the first, second, and third elastomers.

Another version of the invention as a multi-rate torsional coupling for dampening driveline vibrations includes a plurality of parallel drive connections between input and output members. Each of the plurality of drive connections has a resilient member that angularly deflects at a given spring rate function in response to the transmission of torque along the drive connection with which the resilient member is associated. An actuator arrangement controls the engagements of different combinations of the parallel drive connections between the input and output members so that an effective spring rate varies as a sum of the spring rates of the resilient members within the different combinations of parallel drive connections.

The different combinations of parallel drive connections can include both single and multiple drive connections. The actuator can be arranged to engage one or more additional drive connections in response to the transmission of additional torque between the input and output members. The resilient members preferably include shear couplings that connect directly to one of the input and output members. At least one of the shear couplings is preferably connected directly to the other of the input and output members, and at least one other of the shear couplings is preferably connected indirectly to the other of the input and output members through the actuator arrangement. The actuator arrangement can include an angular play coupling along at least one of the parallel drive connections, allowing the one drive connection to remain at least partially disengaged from transferring torque until the input and output members are relatively angularly displaced through a threshold angle of play.

Another version of the invention as a method of dampening driveline vibrations connects a multi-rate torsion coupling along a driveline between input and output members. The input and output members are interconnected through the multi-rate torsion coupling with parallel first and second drive connections. The first drive connection transfers torque between the input and output members though a first resilient member that allows relative angular deflections between the input and output members as a function of the transferred torque. The second drive connection is at least partially limited from transferring torque between the input and output members through a second resilient member until the input and output members are relatively angularly displaced through a threshold angle of play. The second drive connection contributes to the transfer torque between the input and output members through the second resilient member after the input and output members are relatively angularly displaced through at least the threshold angle of play.

The first resilient member provides a dampening effect for angular displacements up to the threshold angle of play, and the first and second resilient members provide a combined dampening effect for angular displacements above the threshold angle of play. The second drive connection can be progressively engaged approaching the threshold angle of play.

Yet another version of the invention as a method of providing overload protection with a multi-rate torsion coupling includes transmitting torque between input and output members of the multi-rate torsion coupling having first and second elastomeric members mounted along parallel first and second drive connections between the input and output members. The first and second elastomeric members are frictionally connected to their first and second drive connections in positions of registration that allow the second drive connection to remain disengaged until the input and output members are relatively angularly displaced through a threshold angle of play. Overload torque is accommodated by allowing at least one of the first and second elastomeric members to temporarily disconnect from the first and second drive connections and relatively move out of registration with respect to the other of the first and second elastomeric members. Overload torque can also be accommodated by allowing both the first and second elastomeric members to disconnect from the first and second drive connections. However, the elastomeric members can be re-registered within the first and second drive connections with respect to each other to restore the relationship that allows the second drive connection to remain disengaged until the input and output members are relatively angularly displaced through the threshold angle of play.

BRIEF DESCRIPTION OF THE DRAWING FIGURES

DETAILED DESCRIPTION OF THE INVENTION

Figure 1:
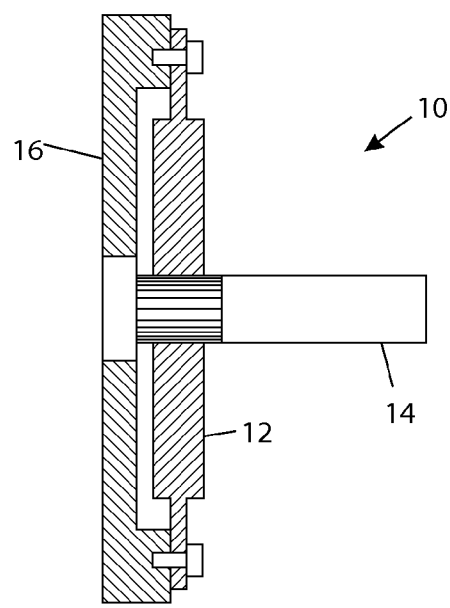
FIG. 1 is a largely schematic illustration of a section of a drive train incorporating a torsional coupling in accordance with the invention.

A limited portion of a driveline 10 is shown in FIG. 1. Depicted within FIG. 1 is a torsional coupling 12 of a type contemplated for the invention connecting a drive shaft 14 to a flywheel 16 of a power plant, such as an internal combustion engine. The driveline 10 is representative of a number of vehicle drivelines including the drivelines of tractors or construction vehicles for which the invention is particularly applicable.

Figure 2:
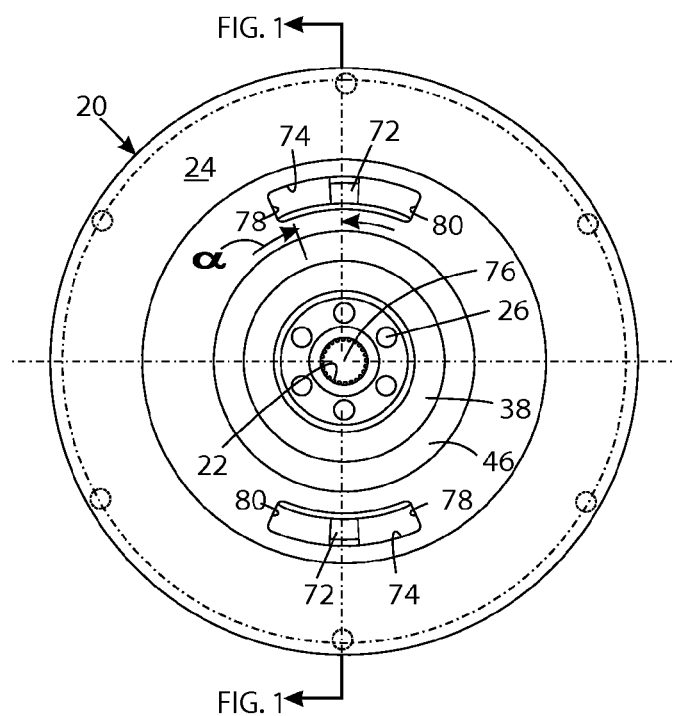
FIG. 2 is a front view of a multi-rate torsional coupling in accordance with the invention having two parallel drive connections.
Figure 3:
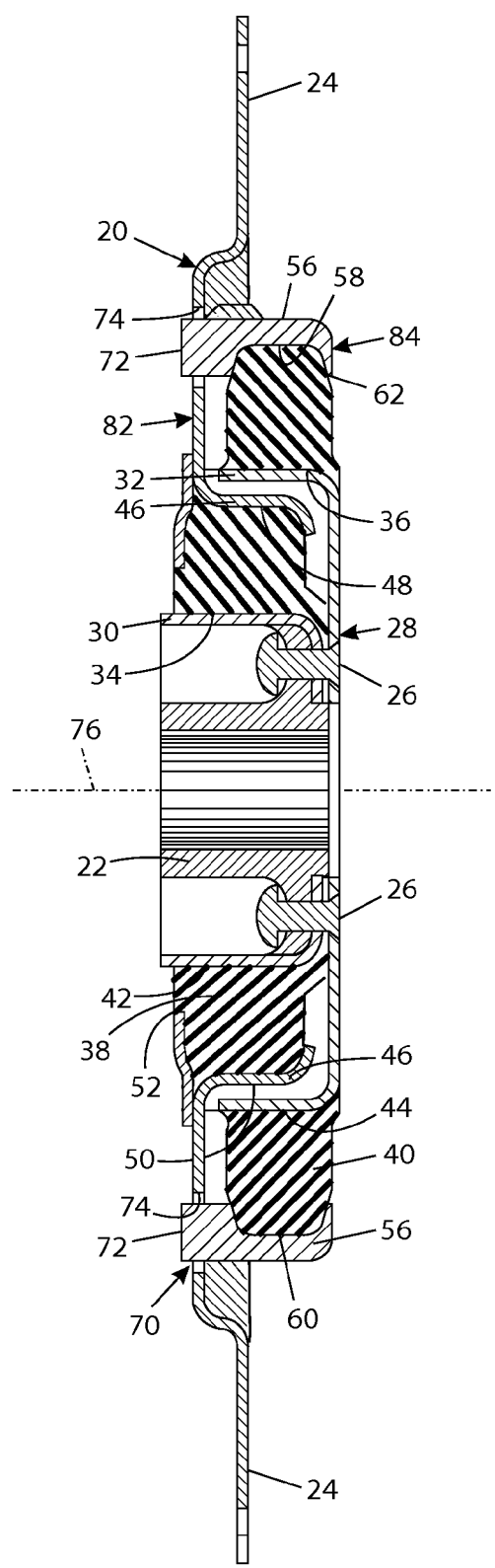
FIG. 3 is a side cross-sectional view of the multi-rate coupling taken along line 3-3 of FIG. 2.

More detailed views of a multi-rate torsional coupling 20 in accordance with the invention are presented in FIGS. 2 and 3. The multi-rate coupling 20 includes the usual features of a splined coupler 22 for connecting the drive shaft 14 and a flange 24 for connecting the flywheel 16. The splined coupler 22 and the flange 24 both function as driveline connectors. In the usual direction of power transmission along the driveline 10, the flange 24 can be considered as an input member, and the splined coupler 22 can be considered as an output member. However, torque transfers can occur in either direction between the splined coupler 22 and the flange 24. Other driveline connectors can be used for connecting the multi-rate coupling 20 to the driveline 10, including keyways, yokes, bushings, or combinations of flanges or splined couplers.

The splined coupler 22 is riveted 26 or otherwise fastened to a compound drive hub 28 (see FIG. 3) having inner and outer concentric hubs 30 and 32 for engaging inner surfaces 34 and 36 of inner and outer elastomeric rings 38 and 40. Contact surfaces 42 and 44 of the concentric hubs 30 and 32 are bonded to the inner surfaces 34 and 36 of the elastomeric rings 38 and 40. A direct drive hub 46, as an extension of the flange 24, includes an opposing contact surface 48 for frictionally engaging an outer surface 50 of the inner elastomeric ring 38. An opening 52 provides for mounting the inner elastomeric ring 38 in place between the contact surface 42 of the inner concentric hub 30 and the opposing contact surface 48 of the direct drive hub 46. An indirect drive hub 56, which is connected indirectly to the flange 24 through an angular play coupling 70, includes an opposing contact surface 58 for frictionally engaging an outer surface 60 of the outer elastomeric ring 40. An opening 62 provides for mounting the outer elastomeric ring 40 in place between the contact surface 44 of the outer concentric hub 32 and the opposing contact surface 58 of the indirect drive hub 56.

The angular play coupling 70 includes tabs 72 that project from the indirect drive hub 56 into arcuate slots or channels 74 (see also FIG. 2) formed through the flange 24. The tabs 72 rotate together with the indirect drive hub 56 about a common axis 76 with respect to the flange 24 through limited angular amounts in opposite directions, i.e., through threshold angles of play α) until the tabs 72 encounter end walls 78 and 80 of the channels 74. Once in engagement with the end walls 78 or 80, the tabs 72 can transmit torque between the indirect drive hub 56 and the flange 24.

Two distinct drive connections 82 and 84 are provided between splined coupler 22 and the flange 24. Both share portions of the compound drive hub 28. Beginning at the conventional output end and working toward the conventional input end, the drive connection 82 proceeds from the compound drive hub 28 through the inner concentric hub 30 and the inner elastomeric ring 38 to the direct drive hub 46, which is formed as an extension of the flange 24. The drive connection 84 proceeds from the compound drive hub 28 through both the outer concentric hub 32 and the outer elastomeric ring 40 to the indirect drive hub 56, which is connected indirectly to the flange 24 through the angular play coupling 70.

Initially, the tabs 72 of the indirect drive hub 56 are not engaged with the end walls 78 and 80 of the channels 74 in the flange 24, so that only the drive connection 82 is in place for transmitting torque between the splined coupler 22 and the flange 24. The inner elastomeric ring 38, which operates as a shear coupling, angularly deflects (shears) between its inner and outer surfaces 34 and 50 as a function of applied torque. The amount of shear can be proportional to, or in another defined relationship with, the transmitted torque, which can be referred to as a "spring rate" in units of torque per angle of shear. The angular deflections between the inner and outer surfaces 34 and 50 of the inner elastomeric ring 38 are also apparent in corresponding angular deflections between the spline coupler 22 and the flange 24.

Given the direct connection of the outer elastomeric ring 40 and indirect drive hub 56 to the compound drive hub 28, the tabs 72 of the indirect drive hub 56 deflect together with the spline coupler 22 with respect to the flange 24. The further deflection of the inner elastomeric ring 38 rotates the tabs 72 into engagement with one or the other of the end walls 78 and 80 of the channels 74, thereby exhausting the threshold angles of play α and engaging the other drive connection 84 between the spline coupler 22 and the flange 24. Additional amounts of torque are transmitted through both drive connections 82 and 84.

The engagement of the drive connection 84 through the outer elastomeric ring 40 does not limit the further deflection of the inner elastomeric ring 38 along the drive connection 82, but the further deflections between the spline coupler 22 and the flange 24 are resisted by the combined spring rates of the inner and outer elastomeric rings 38 and 40. The spring rate of the outer elastomeric ring 40 can be higher or lower than the spring rate of the inner elastomeric ring 38, but the combined spring rate accompanying the engagement of the drive connection 84 is necessarily higher. Since the drive connections 82 and 84 through the elastomeric rings 38 and 40 operate in parallel, the spring rates of the elastomeric rings 38 and 40 are summed.

Figure 4:
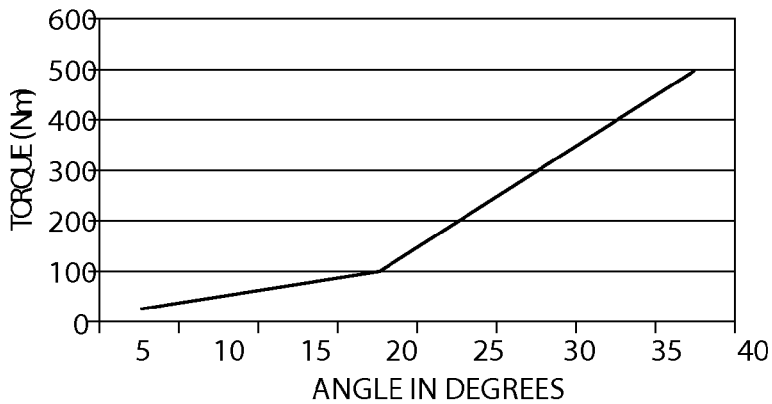
FIG. 4 is a graph of a range of torque transmitted by the multi-rate coupling over a range of angular deflection between the input and output members of the coupling.

The graph in FIG. 4 plots a range of torque in Newton-meters between the spline coupler 22 and the flange 24 over a domain of deflections in degrees also between the spline coupler 22 and the flange 24. The threshold angle of play α is set at 20 degrees. Thus, the entire torque load between the spline coupler and the flange 24 is borne by the drive connection 82 through the inner elastomeric ring 38 until a deflection of 20 degrees is achieved, and thereafter, the additional torque is distributed between the drive connection 82 and the drive connection 84 in accordance with the respective spring rates of the elastomeric rings 38 and 40.

As apparent from the graph, the effective spring rate between 0 degrees and 20 degrees of deflection is equal to approximately 5 Newton-meters per degree of deflection, and the effective spring rate between 20 degrees and 40 degrees is equal to approximately 20 Newton-meters per degree of deflection. The spring rate of 5 Newton-meters per degree through the first 20 degrees of deflection is attributable to the elastomeric ring 38 alone, and the spring rate of 20 Newton-meters per degree for the second 20 degrees of deflection is attributable to the 5 Newton-meters per degree spring rate of the elastomeric ring 38 in combination with an apparent 15 Newton-meters per degree spring rate of the elastomeric ring 40.

Although the threshold angle of play α in this example is set at 20 degrees for engaging the second drive connection 84, other threshold angles of play α can be used to adjust the torque load at which additional stiffness is desired for such purposes as dampening vibrations. For example, a range of threshold angles of play α between 10 degrees and 30 degrees are preferred, with a range between 15 degrees and 25 degrees being more preferred, and with a range between 18 degrees and 22 degrees being even more preferred.

The threshold angles of play α can differ between opposite directions of torque loading, such as between forward and reverse or drive and coast. In FIG. 2, the tabs 72 are shown within the channels 74 equidistant from the end walls 78 and 80 in an unloaded condition. Thus, the angles of play α are equal for the opposite directions of torque loading. However, by either angularly shifting the tabs 72 within the channels 74 or by elongating or shortening either end of the channels 74 with respect to the instant position of the tabs 72, the threshold angles of play α can differ between the opposite directions of torque transfer.

A transitional spring rate associated with a more progressive engagement of the second drive connection 84 can be provided by a resilient or otherwise cushioned interface between the tabs 72 and the end walls 78 and 80 within the flange 24. For example, elastomeric pads (not shown) can be positioned between the tabs 72 and the end walls 78 and 80 to provide another elastomer in series with the elastomeric ring 40 for a limited range of angular deflections approaching the threshold angle of play α. The combined spring rate of the elastomeric pad and elastomeric ring 40, whose inverse can be found by the sum of the inverse spring rates of the elastomeric pad and the elastomeric ring 40, is preferably within a range between the spring rate of the elastomeric ring 38 and the sum of the spring rates of the elastomeric rings 38 and 40.

For purposes of overload protection, the elastomeric rings 38 and 40 preferably have a friction fit with one of the hubs 28, 46, or 56 with which they are engaged. At torque loads that might otherwise damage the driveline 10, the elastomeric rings 38 and 40 can be allowed to slip to limit the transmission of the excessive torque. Ordinarily, the elastomeric rings 38 and 40 are frictionally connected to their hubs 28, 46, or 56 in positions of registration that allow the drive connection 84 to remain disengaged until the spline coupler 22 and the flange 24 are relatively angularly displaced through a threshold angle of play α. Overload torque (i.e., an amount of torque that could otherwise damage the torsion coupling 12 or the driveline 10 in which it is mounted) is accommodated by allowing at least one of the two elastomeric rings 38 of 40 to temporarily disconnect from the first and second drive connections and relatively move out of registration with respect to the other of the first and second elastomeric members. However, the elastomeric members can be re-registered within the first and second drive connections with respect to each other to restore the relationship that allows the second drive connection to remain disengaged until the input and output members are relatively angularly displaced through the threshold angle of play.

The re-registration operation can involve the removal of the torsion coupling 12 from the driveline 10 and the return of the torsion coupling 12 to a factory or dealer setting. Any damage to the elastomeric rings 38 and 40 or to their mountings within the torsion coupling 12 can be repaired before returning the torsion coupling 12 for remounting into the driveline.

Figure 5:
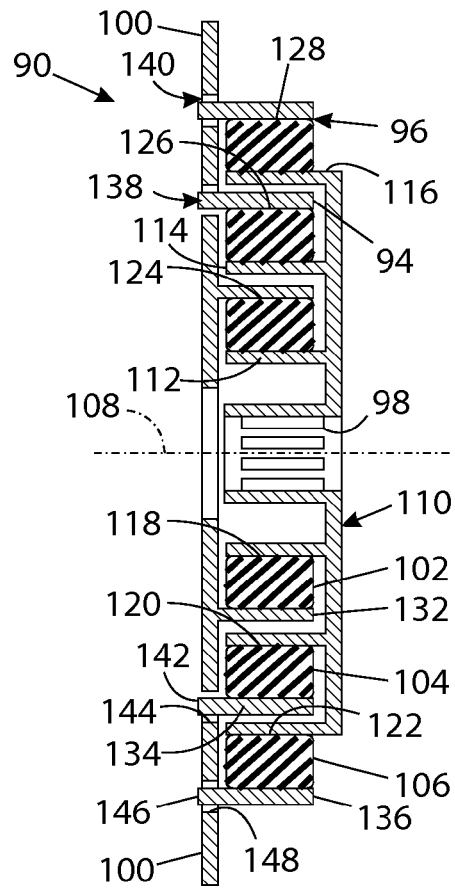
FIG. 5 is a schematic cross-sectional view of a multi-rate torsional coupling in accordance with the invention having three drive connections.
Figure 6:
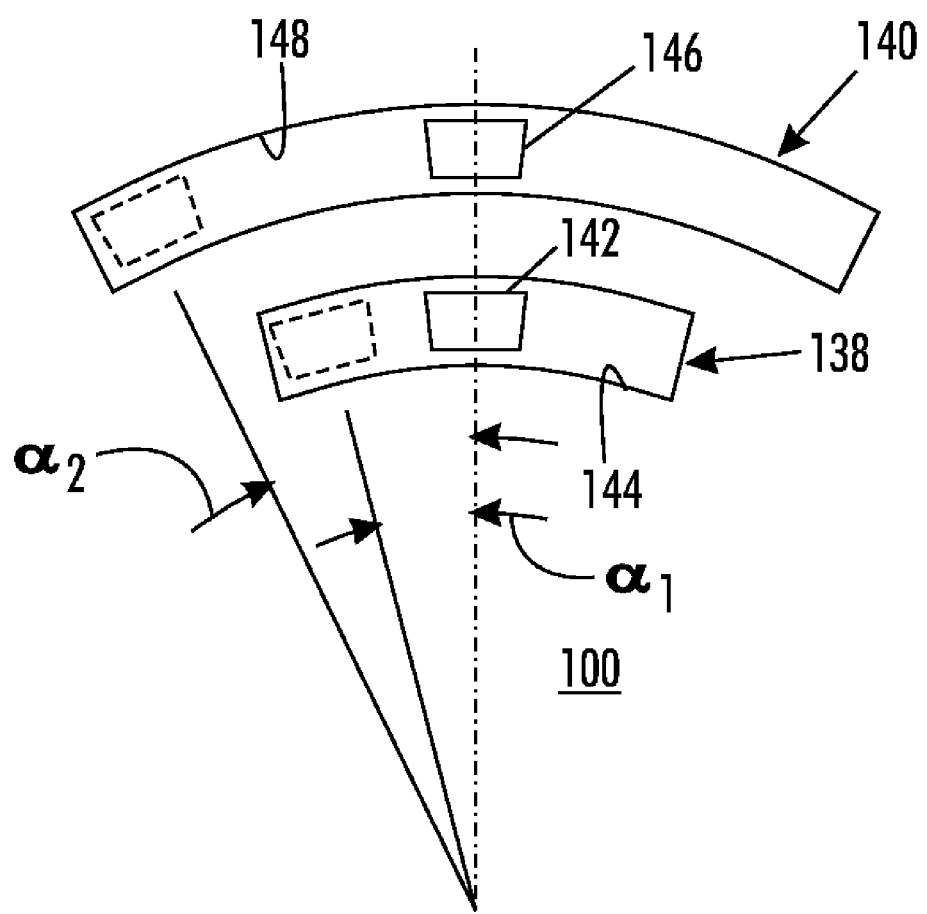
FIG. 6 is a partial front view of the schematic torsional coupling of FIG. 5 depicting two angular play couplings for engaging second and third drive connections at different torque loads.

A multi-rate torsional coupling 90 depicted in FIGS. 5 and 6 in a schematic form illustrates the use of three drive connections 92, 94, and 96 for providing three different spring rates over a range of torque transmission between a spline coupler 98 and a flange 100. Each of the drive connections 92, 94, and 96 includes an elastomeric ring 102, 104, or 106 along its length, and the drive connections 92, 94, and 96 can be engaged in different combinations for conveying torque between the spline coupler 98 and the flange 100 at different spring rates.

Fixed for rotation with the spline coupler 98 about a common axis 108 is a compound drive hub 110 that includes an inner drive hub 112 bonded to an inner surface 118 of the elastomeric ring 102, an intermediate drive hub 114 bonded to an inner surface 120 of the elastomeric ring 104, and an outer drive hub 116 bonded to an inner surface 122 of the elastomeric ring 106. A direct drive hub 132, which is fixed for rotation with the flange 100 about the common axis 108, frictionally engages an outer surface 124 of the elastomeric ring 102. An indirect drive hub 134, which is indirectly connected to the flange 100 through an angular play coupling 138, frictionally engages an outer surface 126 of the elastomeric ring 104. Similarly, an indirect drive hub 136, which is indirectly connected to the flange 100 through an angular play coupling 140, frictionally engages an outer surface 128 of the elastomeric ring 106.

The angular play coupling 138 (see also FIG. 6) includes tabs 142 that project from the indirect drive hub 134 into arcuate channels 144 formed through the flange 100. Until the indirect drive hub 134, which is connected to the spline coupler 98, and the flange 100 are relatively angularly deflected through the threshold angle of play $\alpha_1$, the drive connection 94 does not substantially contribute to the transmission of torque between the spline coupler 98 and the flange 100. However, once engaged through the angular play coupling 138, the drive connection 94 provides a second parallel connection between the spline coupler 98 and the flange 100.

Similarly, the angular play coupling 140 includes tabs 146 that project from the indirect drive hub 136 into arcuate channels 148 formed through the flange 100. Until the indirect drive hub 136, which is connected to the spline coupler 98, and the flange 100 are relatively angularly deflected through the threshold angle of play $\alpha_2$, the drive connection 96 does not substantially contribute to the transmission of torque between the spline coupler 98 and the flange 100. However, once engaged through the angular play coupling 140, the drive connection 96 provides a third parallel connection between the spline coupler 98 and the flange 100.

Regardless of the torque load between the spline coupler 98 and the flange 100, the drive connection 92 remains engaged for transmitting torque through its elastomeric ring 102. Through an initial range of torque loads, the drive connection 92 provides the sole connection between the spline coupler 98 and the flange 100, dampening vibrations in accordance with the spring rate of its elastomeric ring 102. Through a second higher range of torque loads resulting in the deflection of the elastomeric ring 102 through at least the threshold angle of play $\alpha_1$, the drive connection 94 adds a second connection between the spline coupler 98 and the flange 100, dampening vibrations in accordance with the combined spring rates of the elastomeric rings 102 and 104. Through a third even higher range of torque loads resulting in the deflection of the elastomeric rings 102 and 104 through at least the threshold angle of play $\alpha_2$, the drive connection 96 contributes a third connection between the spline coupler 98 and the flange 100, dampening vibrations in accordance with the combined spring rates of the elastomeric rings 102, 104, and 106.

Although the angular play couplings 138 and 140 of this and the preceding embodiment provide for selectively coupling indirect drive hubs to the flange, similarly functioning angular play couplings could be used to connect indirect drive hubs to an extension of the spline coupler 98 or other driveline connector. In designs with three or more drive connections, one of the angular play couplings could be connected to an input drive connection and another of the angular play couplings could be connected to an output drive connection. In addition, resilient transmission mechanisms can be incorporated into the angular play couplings in series with the affected elastomeric rings to engage the different drive connections at intermediate spring rates. Other known types of coupling mechanisms could also be used for progressively engaging additional drive connections in response to predetermined levels of deflection, torque, or rotational speed.

The invention describes a limited number of embodiments within a more general context for providing those of skill in the art with sufficient teaching to practice the invention according to their own more specific purposes. Accordingly, various modifications and adaptations apparent to those of skill in the art can be made without departing from the intended spirit and scope of this invention.

The invention claimed is:

1. A method of providing overload protection with a multi-rate torsion coupling comprising steps of
    transmitting torque between input and output members of the multi-rate torsion coupling having first and second elastomeric members mounted along parallel first and second drive connections between the input and output members,
    frictionally connecting the first and second elastomeric members with their first and second drive connections in positions of registration that allow the second drive connection to remain disengaged until the input and output members are relatively angularly displaced through a threshold angle of play,
    accommodating overload torque by allowing at least one of the first and second elastomeric members to temporarily disconnect from the first and second drive connections and relatively move out of registration with respect to the other of the first and second elastomeric members, and
    re-registering the elastomeric members within the first and second drive connections with respect to each other to restore the relationship that allows the second drive connection to remain disengaged until the input and output members are relatively angularly displaced through the threshold angle of play.

2. The method of claim 1 in which the step of accommodating overload torque includes allowing both the first and second elastomeric members to disconnect from the first and second drive connections.

* * * * *